B. L. CALKINS.
HACKSAW BLADE.
APPLICATION FILED AUG. 30, 1919.
1,328,982.
Patented Jan. 27, 1920.
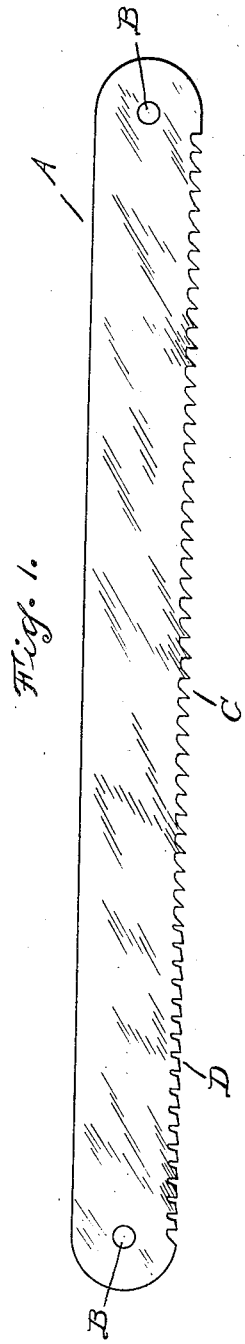
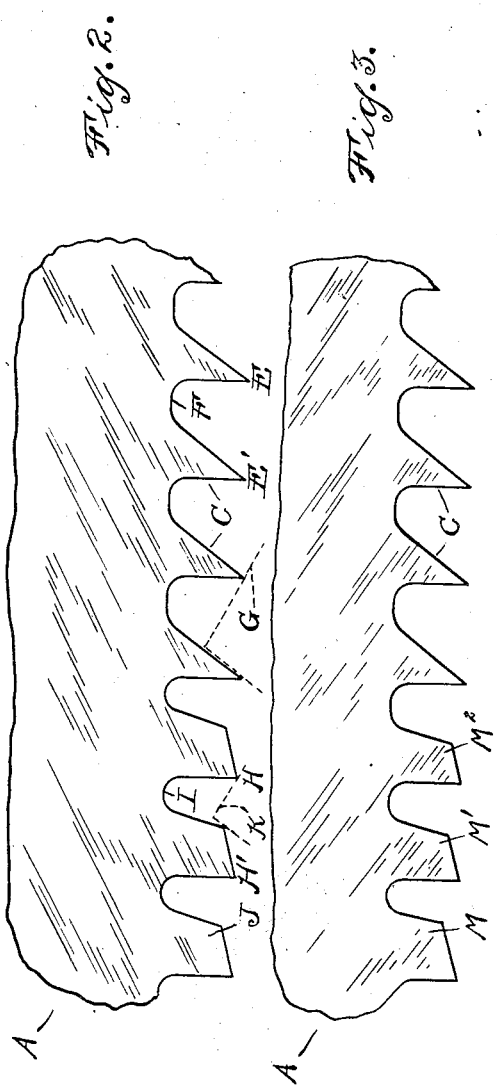
Inventor
Bert L. Calkins
By Whittemore Hulbert Whittemore
Attorneys

UNITED STATES PATENT OFFICE.

BERT L. CALKINS, OF DETROIT, MICHIGAN.

HACKSAW-BLADE.

1,328,982.  Specification of Letters Patent.  Patented Jan. 27, 1920.

Application filed August 30, 1919. Serial No. 320,847.

*To all whom it may concern:*

Be it known that I, BERT L. CALKINS, a citizen of the United States of America, residing at Detroit, in the county of Wayne and State of Michigan, have invented certain new and useful Improvements in Hacksaw-Blades, of which the following is a specification, reference being had therein to the accompanying drawings.

This invention relates to hack saw blades and refers more particularly to a new and improved hack saw blade wherein the entrance or some other designated portion of the blade is provided with teeth so constructed and arranged that they cannot enter the work, that is take as big a bite as the teeth in other portions of the blade.

Invention also resides in the novel arrangement wherein the teeth at the entrance or some other desired portion are provided with extra backing and in the arrangement whereby substantially the same pitch can be employed for all of the teeth of the blade, and in such further details of construction as will more fully hereinafter appear.

In the drawings,

Figure 1 is a side elevational view of a hack saw blade embodying my invention;

Fig. 2 is an enlarged fragmentary elevational view showing a portion of the teeth;

Fig. 3 is a view similar to Fig. 2 showing a slightly modified construction.

Describing in detail the construction shown in the drawing, A designates a hack saw blade which may be of either the hand or power type and is preferably of that type in which the blade is lifted out of contact with the bottom of the saw cut during the return or non-working stroke. At its ends the blade is provided with the usual apertures B by means of which it is secured to the frame and is also provided with a series of teeth C.

It will be noticed that the teeth C are all substantially the same almost throughout the length of the blade but at one end the blade is provided with special teeth D the construction and arrangement of which teeth and their combination in relation to the remaining teeth form an important feature of my invention. The detailed construction of the two shapes of teeth are best shown in Fig. 2 in which it will be noticed that the main set of teeth C are arranged with a tooth angle of 55° and have a tooth depth extending from the point E to the rear end F of the gullet. This leaves a relatively wide space between the points E and E' so that if the blade is arranged at an angle to the work the corner of the work might enter into the position shown by the dotted line G in Fig. 2. If, however, it were allowed to hog into the work to this extent at the beginning of the stroke it is obvious that there will be great danger of breaking off the teeth as it is well understood in the art that the greatest chance of breakage of the teeth is at the start of the stroke.

I therefore provided a novel arrangement whereby the teeth at the entrance portion or any other desired portion of the blade will be prevented from gripping or hogging into the work to the extent shown by the dotted line G. As shown in Fig. 2 the teeth D have the same distance between their points H and H' as between the points E and E' of the teeth C and the depth of the teeth D, that is from the point H to the point I is substantially the same depth as the depth of the teeth C from the point E to the point F. The amount of clearance opening, however, is materially cut down by providing the teeth D with a backing portion J which not only materially strengthens the teeth but also cuts down the clearance opening and prevents the teeth from gripping or hogging into the work to the same depth that the main body of the teeth of the saw blade are capable of. This bite of the teeth D is shown by the dotted line K in Fig. 2.

In place of forming the teeth D with the same size of backing portion J, I may employ the construction shown in Fig. 3 in which the amount of clearance opening is gradually increased, from the tooth M to the tooth M' to the tooth M² whereby a gradually increasing chip clearance will be provided as the saw blade progresses toward the main body of the teeth. By this novel arrangement the strongest teeth will be those which would first strike the work and at the same time the chip clearance is gradually increased to correspond with the accumulation of material as the saw blade progresses. Obviously if it was so desired, this gradual increase in clearance opening would be carried throughout the length of the saw blade. In both of the constructions, however, the reinforcement or smaller clearance opening teeth have the same pitch, thus materially simplifying the manufacture and setting of the saw as it allows for the same setting. Also the fact that the starting teeth have the same setting as the main portion of the teeth avoids the jerk or other detrimental effect which would take place when the main body of the teeth came into the work in case a series of the teeth of smaller set were used at the entrance portion of the work.

While I have referred to the set of teeth D as the starting teeth or those at the entrance of the work, the invention is not necessarily limited to the location of the teeth in the portion of the saw as shown in the drawings, but could be employed at any portion desired and various other changes in the details of construction could be of course made within the scope of invention.

What I claim as my invention is:

1. A saw blade having a series of relatively coarse teeth and associated therewith a series of teeth of substantially the same pitch but of lesser gullet opening than the first mentioned teeth.

2. A saw blade having a series of relatively coarse teeth and associated therewith a series of teeth of substantially the same pitch, said teeth having a backing portion arranged to leave a lesser chip clearance opening than the first mentioned set of teeth.

3. A hack saw blade having a plurality of sets of teeth, the points of which are of substantially equal distance from each other and a portion of said teeth having a lesser clearance opening than the remainder of said teeth.

4. A hack saw blade having a plurality of sets of teeth, the points of which are of substantially equal distance from each other and a portion of said teeth having a lesser clearance opening than the remainder of said teeth, the distance from the bottom of the clearance opening to the point of the teeth being substantially the same for both of the teeth.

In testimony whereof I affix my signature.

BERT L. CALKINS.